G. PATTERSON.
VEHICLE.
APPLICATION FILED JULY 15, 1914.

1,207,203.

Patented Dec. 5, 1916.
3 SHEETS—SHEET 1.

Witnesses
M. P. McKee
J. M. Bowie

Inventor
G. Patterson
by Alex. J. Wedderburn, Jr.
Attorney

G. PATTERSON.
VEHICLE.
APPLICATION FILED JULY 15, 1914.

1,207,203.

Patented Dec. 5, 1916.
3 SHEETS—SHEET 2.

Witnesses
M. P. McKee
J. M. Bowie

Inventor
G. Patterson
by Alex. J. Wedderburn, Jr.
Attorney

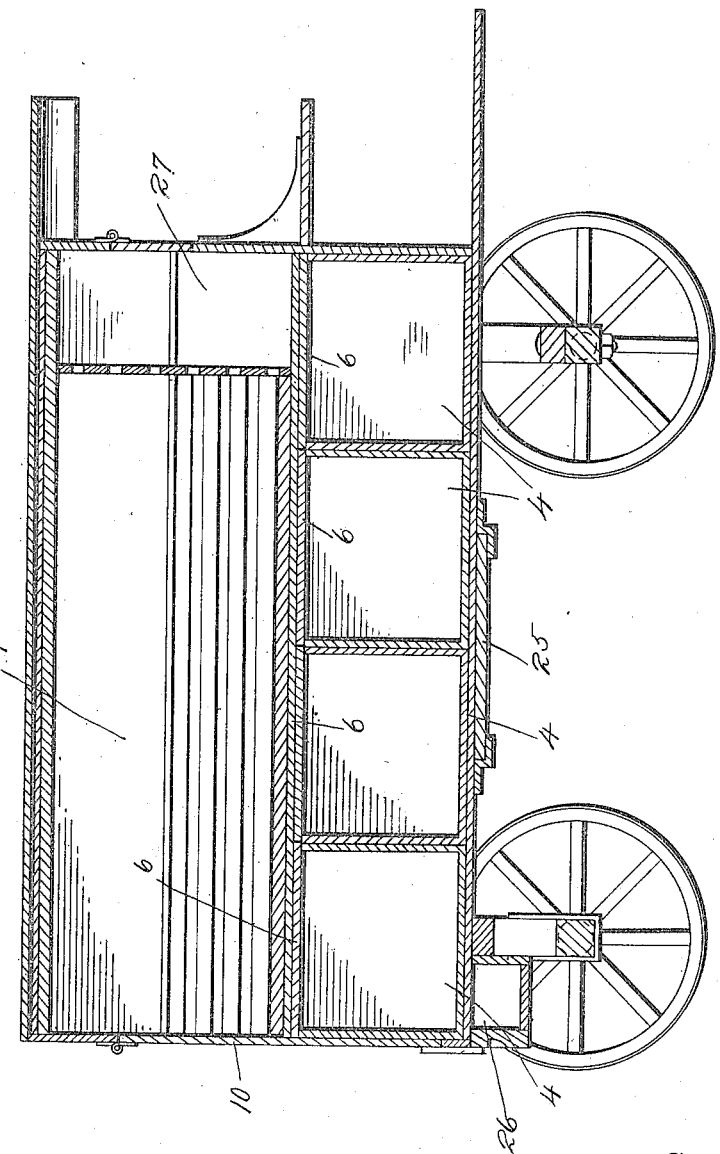

UNITED STATES PATENT OFFICE.

GEORGE PATTERSON, OF MANCHESTER, NEW HAMPSHIRE.

VEHICLE.

1,207,203.

Specification of Letters Patent.

Patented Dec. 5, 1916.

Application filed July 15, 1914. Serial No. 851,096.

*To all whom it may concern:*

Be it known that I, GEORGE PATTERSON, a citizen of the United States, residing at Manchester, in the county of Hillsboro and State of New Hampshire, have invented certain new and useful Improvements in Vehicles, of which the following is a specification.

This invention relates to improvements in vehicles and has for its object to provide a vehicle adapted especially for the use of a huckster.

Another object of the invention is to provide a vehicle having a series of compartments.

Still another object of the invention is to provide a refrigerator huckster cart.

With the above and other objects in view I have invented the device described in the accompanying views in which—

Figure 1:
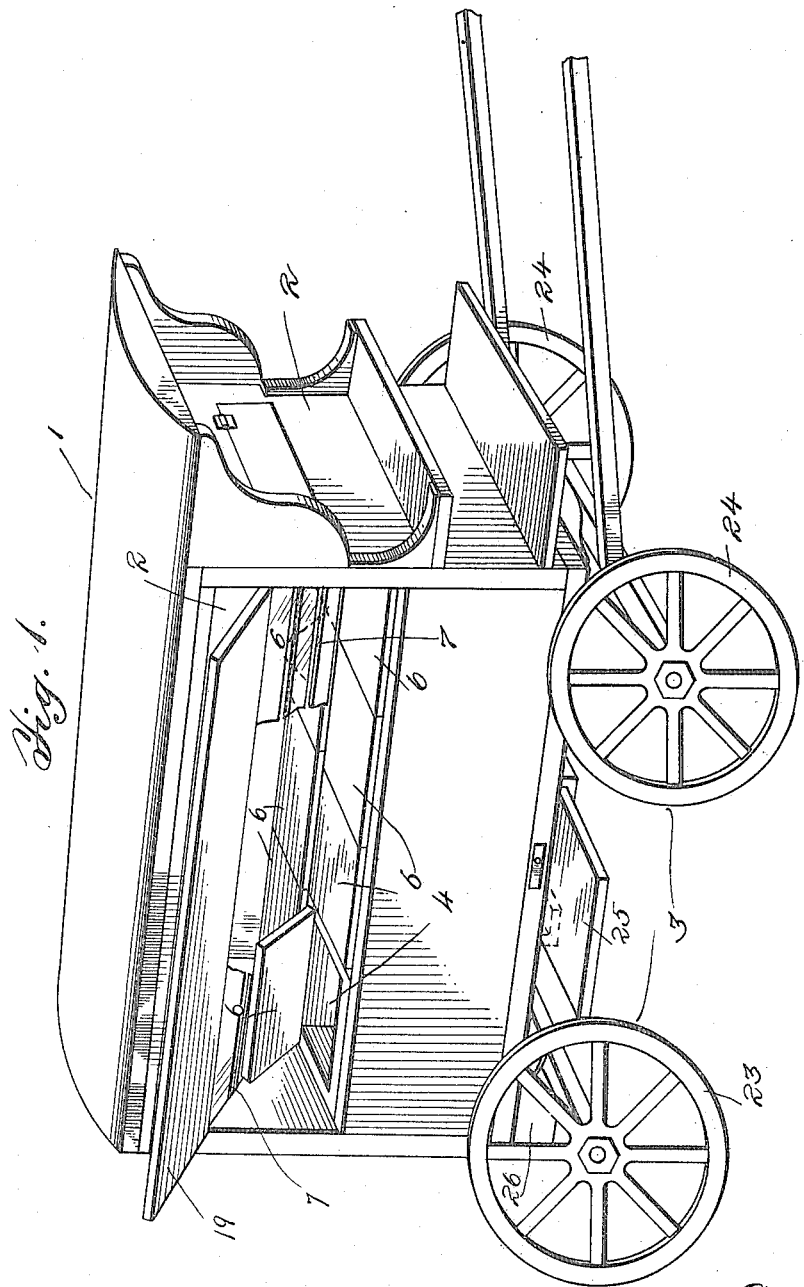
Figure 2:
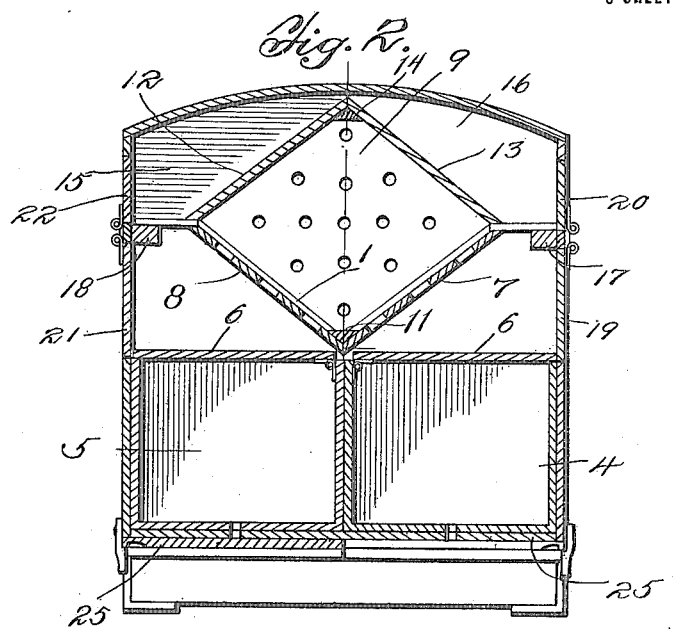
Figure 3:
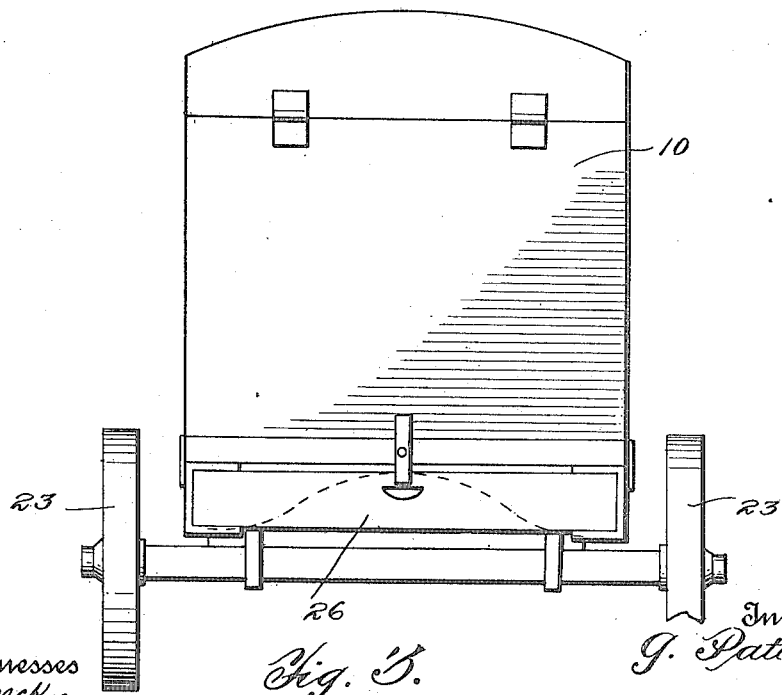

Figure 1, is a perspective view of my improved vehicle. Fig. 2, is a transverse sectional view of the body thereof. Fig. 3, is a rear view of the vehicle, Fig. 4, is a longitudinal sectional view of the vehicle.

Like reference characters designate like or corresponding parts throughout the several views in which 1, represents my improved vehicle, which consists of a body 2, and a running gear 3, my invention being embraced in the body of the vehicle which embraces a row of compartments 4, on one side of the vehicle and a row of compartments 5, on the other side thereof. Each of these compartments is provided with a hinged top 6, which may be raised against the lower wall 7, or the lower wall 8, of the ice compartment 9, which extends nearly the entire length of the body of said vehicle and which may be loaded through said gate 10. By means of this ice compartment, the entire contents of the body of the vehicle may be kept cool without coming directly into contact with the ice contained in the compartment 9. The walls 7 and 8, are inclined upwardly from the lower portion 11, thereof, and the upper surfaces 12 and 13, inclined downwardly from the upward portion 14, thereof. These spaces 15 and 16, are filled with a series of compartments for vegetables, canned goods, etc.

Longitudinal bars 17 and 18, extend the entire length on the body of the wagon, and form supports upon which the side gates 19, 20, 21, and 22, are hingedly mounted. The gates 19 and 21, are adapted to be raised to allow entrances into the compartments 4 and 5, and the gates 20 and 22, are adapted to be lowered to permit entrances into spaces 15 and 16.

Slidably mounted under the body of the wagon and between the rear wheels 23 and the forward wheel 24, is a meat chopper block 25, which may be drawn outwardly from either side of the vehicle. Under the body proper, thereof is slidably mounted a tool drawer 26. The forward part of the body is provided with a milk compartment 27 connecting with the ice compartment 9.

Having now described my invention what I claim as new and desire to secure by Letters Patent is:—

1. The described device consisting of a vehicle having a body provided with two rows of compartments on the opposing sides thereof, side gates on said wagon whereby said compartment may be readily reached, a longitudinal ice compartment mounted above said other compartments, the upper wall of said last compartment being inclined, and two rows of compartments provided in the space formed by said inclined walls, a rear gate whereby access may be had to said ice compartment.

2. The described device consisting of a vehicle having a body provided with two rows of compartments on the opposing sides thereof, side gates on said wagon whereby said compartments may be readily reached, a longitudinal ice compartment mounted above said other compartments, the upper wall of said last compartment being inclined, and two rows of compartments provided in the space formed by said inclined walls, a rear gate whereby access may be had to said ice compartment, and downwardly swinging gates whereby access may be had to said compartments above said ice compartment.

3. The described device consisting of a vehicle having a body provided with two rows of compartments on the opposing sides thereof, side gates on said wagon whereby said compartments may be readily reached, a longitudinal ice compartment mounted above said other compartments, the upper wall of said last compartment being inclined, and two rows of compartments provided in the space formed by said inclined wall, a rear gate whereby access may be had to said ice compartment, and downwardly swinging gates whereby access may be had to said compartments above said ice compartment, and milk carrying compartments adjacent said ice compartment.

4. The described device consisting of a vehicle body, a longitudinal ice box centrally suspended in the upper part of said body, and a plurality of compartments formed above said box, the walls of said box forming a wall for each of said compartments, other compartments having hinged lids formed under said box, said box being diamond shape in cross section.

5. The described device consisting of a vehicle body, a longitudinal ice box centrally suspended in the upper part of said body, and a plurality of compartments formed above said box, the walls of said box forming a wall for each of said compartments, other compartments having hinged lids formed under said box, said box being diamond shape in cross section, and having centrally arranged vertically opposing corners.

6. The described device consisting of a vehicle body, a longitudinal ice box centrally suspended in the upper part of said body, and a plurality of compartments formed above said box, the walls of said box forming a wall for each of said compartments, other compartments having hinged lids formed under said box, said box being diamond shape in cross section, and having centrally arranged vertically opposing corners, and centrally arranged horizontally opposing corners, whereby the bottom walls of said box are inclined, to provide space into which said lids may be raised.

In testimony whereof I affix my signature in presence of two witnesses.

GEORGE PATTERSON.

Witnesses:
G. D. THIBAUDEAU.
O. F. MOREAU.

Copies of this patent may be obtained for five cents each, by addressing the "Commissioner of Patents, Washington, D. C."